(12) United States Patent
Yang et al.

(10) Patent No.: US 11,683,083 B2
(45) Date of Patent: Jun. 20, 2023

(54) BEAM FAILURE PROCESSING METHOD, TERMINAL, AND NETWORK DEVICE

(71) Applicant: VIVO MOBILE COMMUNICATION CO., LTD., Chang'an Dongguan (CN)

(72) Inventors: Yu Yang, Chang'an Dongguan (CN); Peng Sun, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 304 days.

(21) Appl. No.: 17/035,017

(22) Filed: Sep. 28, 2020

(65) Prior Publication Data

US 2021/0013950 A1 Jan. 14, 2021

Related U.S. Application Data

(63) Continuation of application No. PCT/CN2019/077664, filed on Mar. 11, 2019.

(30) Foreign Application Priority Data

Mar. 28, 2018 (CN) .......................... 201810264915.1

(51) Int. Cl.
*H04B 7/06* (2006.01)
*H04L 5/00* (2006.01)
(Continued)

(52) U.S. Cl.
CPC .......... *H04B 7/0695* (2013.01); *H04L 5/0094* (2013.01); *H04L 5/0098* (2013.01);
(Continued)

(58) Field of Classification Search
CPC ..... H04L 5/0007; H04L 5/005; H04L 5/0094; H04L 5/0098; H04B 7/0695;
(Continued)

(56) References Cited

U.S. PATENT DOCUMENTS

2018/0049203 A1   2/2018  Xue et al.
2019/0173740 A1*  6/2019  Zhang ................. H04W 72/042
(Continued)

FOREIGN PATENT DOCUMENTS

CN    107404365 A   11/2017
EP      3525516 A1   8/2019
WO  WO2019130518 A1  12/2020

OTHER PUBLICATIONS

Nokia, Nokia Shanghai Bell "BWP switch interaction with contention free BFR preamble"; 3GPP TSG-RAN WG2 Meeting #101 Athens, Greece, Feb. 26-Mar. 2, 2018 R2-1803229 (Year: 2018).*
Extended European Search Report for related Application No. 19777604.0; dated Mar. 22, 2021.
CATT, "BWP for Beam Failure Recovery", Jan. 22-26, 2018, 3GPP TSG-RAN WG2 NR Ad hoc 0118, Vancouver, Canada.
(Continued)

*Primary Examiner* — Gary Mui
(74) *Attorney, Agent, or Firm* — von Briesen & Roper, s.c.

(57) ABSTRACT

A beam failure processing method, a terminal and a network device are provided. The method includes: sending a beam failure recovery request to a network device in a case that a beam failure event occurs on an active BWP; and receiving, through a CORESET-BFR in a target downlink BWP, response information fed back by the network device according to the beam failure recovery request, where the target downlink BWP corresponds to at least two BWPs, and the at least two BWPs includes the active BWP.

20 Claims, 3 Drawing Sheets

--- sending a beam failure recovery request to a network device in a case that a beam failure event occurs on an active BWP — 11 receiving, through a CORESET-BFR in a target downlink BWP, response information fed back by the network device according to the beam failure recovery request — 12

(51) Int. Cl.
*H04W 76/19* (2018.01)
*H04W 72/0453* (2023.01)
*H04W 74/08* (2009.01)
*H04W 72/53* (2023.01)

(52) U.S. Cl.
CPC ....... *H04W 72/0453* (2013.01); *H04W 72/53* (2023.01); *H04W 74/0833* (2013.01); *H04W 76/19* (2018.02)

(58) Field of Classification Search
CPC ......... H04W 72/0453; H04W 72/0493; H04W 76/0833; H04W 76/19
See application file for complete search history.

(56) References Cited

U.S. PATENT DOCUMENTS

| | | | | |
|---|---|---|---|---|
| 2019/0200248 | A1* | 6/2019 | Basu Mallick | H04B 7/0695 |
| 2019/0253941 | A1* | 8/2019 | Cirik | H04W 36/0077 |
| 2019/0261244 | A1* | 8/2019 | Jung | H04L 1/20 |
| 2020/0059397 | A1* | 2/2020 | da Silva | H04B 7/0617 |
| 2020/0221428 | A1* | 7/2020 | Moon | H04B 7/024 |
| 2020/0344621 | A1* | 10/2020 | Xu | H04B 7/0617 |
| 2021/0058133 | A1* | 2/2021 | Takeda | H04W 72/042 |
| 2021/0058804 | A1* | 2/2021 | Yang | H04B 7/088 |
| 2021/0204346 | A1* | 7/2021 | Ye | H04B 7/00 |

OTHER PUBLICATIONS

NTT DOCOMO, "RAN WG's progress on NR WI in the November meeting 2017", Jan. 22-26, 2018, 3GPP TSG-RAN WG2 NR Ad-hoc 1801, Vancouver, Canada.
VIVO, "Discussion on the impact on beam failure recover", Feb. 26-Mar. 2, 2018, 3GPP TSG-RAN WG2 Meeting #101, Athens, Greece.
Japanese Notice of Reasons for Refusal for related Application No. 2020-551541; dated Nov. 24, 2021.
VIVO; "Remaining issue on mechanism to recover from beam failure", 3GPP TSG RAN WG1 Meeting #92, Athens, Greece, Feb. 26-Mar. 2, 2018, RI-1801521.
International Search Report & Written Opinion related to Application No. PCT/CN2019/077664; dated Oct. 8, 2020.
QUALCOMM Incorporated, "Beam recovery procedures", Feb. 26-Mar. 2, 2018, 3GPP TSG RAN WG1 Meeting #92, Athens, Greece.
First Korean Office Action related to Application No. 10-2020-7031090; dated Sep. 1, 2022.
R2-1803229—Source: Nokia, Nokia Sanghai Bell "BWP switch interaction with contention free BFR preamble", Agenda Item: 10.3.1.4.2, WID/SID: NR_newRAT-core—Release 15, Discussion for: Discussion and Decision, 3GPP TSG-RAN WG2 Meeting #101 Athens, Greece, Feb. 26-Mar. 2, 2018.

* cited by examiner

| receiving a beam failure recovery request from a terminal in a case that a beam failure event occurs on an active BWP | — 41 |

| sending, on a CORESET-BFR in a target downlink BWP, response information to the terminal according to the beam failure recovery request | — 42 |

BEAM FAILURE PROCESSING METHOD, TERMINAL, AND NETWORK DEVICE

CROSS REFERENCE OF RELATED APPLICATION

This patent application is a bypass continuation under 35 U.S.C. § 111 of PCT Application No. PCT/CN2019/077664 filed on Mar. 11, 2019, which claims a priority of Chinese patent application No. 201810264915.1 filed on Mar. 28, 2018, which is incorporated herein by reference in its entirety.

TECHNICAL FIELD

The present disclosure relates to the field of communications technologies, and in particular to a beam failure processing method, a terminal and a network device.

BACKGROUND

The Long-term evolution (Long Time Evolution, LTE) or the advanced LTE (LTE-Advanced, LTE-A) wireless access technology uses the multiple input multiple output (Multiple Input Multiple Output, MIMO) and the orthogonal frequency division multiplexing (Orthogonal Frequency Division Multiplexing, OFDM) technology. The MIMO technology utilizes the antenna system to gain the spatial freedom, improve the peak rate and system spectrum utilization.

In the future fifth-generation (5G, Generation) mobile communication system, or new radio (New Radio, NR) system, the supported working frequency band will be increased to above 6 GHz, with a maximum of about 100 GHz. The high frequency band has relatively abundant idle frequency resources, which can provide greater throughput for data transmission. In order to achieve the downlink transmission rate of 20 Gbps and the uplink transmission rate of 10 Gbps, the high-frequency antennas and the MIMO technology with a larger scale and more antenna ports will be introduced. The wavelength of the high-frequency signal is short. Compared with the low frequency band, for the high-frequency signal, more antenna elements may be arranged on the panel of the same size, and beams with stronger directivities and narrower lobes may be formed through the beamforming technology. The MIMO technology uses a large-scale antenna array, thereby greatly improving the frequency band utilization efficiency of the system and supporting a larger number of access users.

In order to meet different business with different needs and different application scenarios, in a 5G system, a cell covered by network device will support a relatively large bandwidth (e.g., 400 MHz), but the terminal may only support a relatively small working bandwidth (e.g., less than 400 MHz), the small bandwidth part of the terminal working in the large bandwidth is considered to be a bandwidth part (Bandwidth Part, BWP). The terminal may work on multiple small BWPs, and each BWP corresponds to its own Numerology, bandwidth and frequency location. For a terminal in a connected state, the network device may allocate or activate one or more BWPs for the terminal to transmit data and control. The active (Active) BWP switch is implemented through a radio resource control (Radio Resource Control, RRC), downlink control information (Downlink Control Information, DCI) or a timer. For example, the DCI on the first control resource set (Control Resource Set, CORESET) instructs the terminal to switch to the second CORESET. After the terminal switches to the second CORESET, the CORESET is the active BWP, and there are at most 3 CORESETs on each BWP of each cell, and the ID of the CORESET configured by the physical broadcast channel (Physical Broadcast Channel, PBCH) is 0.

In a high-frequency communication system, because the wavelength of the wireless signal is short, the signal transmission is apt to be blocked, which causes the signal transmission to be interrupted. If the signal transmission is reestablished through the radio link in the related art, it will take a long time. Therefore, a beam failure recovery (Beam Failure Recovery, BFR) mechanism is introduced. After a beam failure occurs, the terminal sends a beam failure recovery request to the network device side. After the device receives the beam failure recovery request, it will send response information for the beam failure recovery request in the dedicated physical downlink control channel (Dedicated Physical Downlink Control Channel, dedicated PDCCH) on the CORESET-BFR (CORESET for BFR), and the terminal monitors the response information on the CORESET-BFR configured by the network device. However, since the network device can configure at most 4 downlink BWPs for the terminal, and each BWP has at most 3 CORESETs. If the network device configures a CORESET-BFR for the beam failure recovery mechanism on each downlink BWP, then the quantity of CORESETs used for the normal communication process will be reduced, and more CORESET will be occupied, then the CORESETs used for the normal communication will be insufficient.

SUMMARY

A beam failure processing method, a terminal and a network device are provided in the embodiments of the present disclosure.

In a first aspect, a beam failure processing method is provided in an embodiment of the present disclosure, applied to a terminal side, including:

sending a beam failure recovery request to a network device in a case that a beam failure event occurs on an active Bandwidth Part (active BWP); and receiving, through a Control Resource Set for Beam Failure Recovery (CORESET-BFR) in a target downlink BWP, response information fed back by the network device according to the beam failure recovery request, where the target downlink BWP corresponds to at least two BWPs, and the at least two BWPs includes the active BWP.

In a second aspect, a terminal is provided in an embodiment of the present disclosure, including:

a first sending module, configured to send a beam failure recovery request to a network device in a case that a beam failure event occurs on an active Bandwidth Part (active BWP); and a first receiving module, configured to receive, through a Control Resource Set for Beam Failure Recovery (CORESET-BFR) in a target downlink BWP, response information fed back by the network device according to the beam failure recovery request, where the target downlink BWP corresponds to at least two BWPs, and the at least two BWPs includes the active BWP.

In a third aspect, a terminal is provided in an embodiment of the present disclosure, including: a processor, a memory and a computer program stored in the memory and executable on the processor, where the processor executes the computer program to perform the beam failure processing method hereinabove.

In a fourth aspect, a beam failure processing method is provided in an embodiment of the present disclosure, applied to a network device side, including:

receiving a beam failure recovery request from a terminal in a case that a beam failure event occurs on an active Bandwidth Part (active BWP); and sending, on a Control Resource Set for Beam Failure Recovery (CORESET-BFR) in a target downlink BWP, response information to the terminal according to the beam failure recovery request, where the target downlink BWP corresponds to at least two BWPs, and the at least two BWPs includes the active BWP.

In a fifth aspect, a network device is provided in an embodiment of the present disclosure, including:

a second receiving module, configured to receive a beam failure recovery request from a terminal in a case that a beam failure event occurs on an active Bandwidth Part (active BWP); and a second sending module, configured to send, on a Control Resource Set for Beam Failure Recovery (CORESET-BFR) in a target downlink BWP, response information to the terminal according to the beam failure recovery request, where the target downlink BWP corresponds to at least two BWPs, and the at least two BWPs includes the active BWP.

In a sixth aspect, a network device is provided in an embodiment of the present disclosure, including a processor, a memory and a computer program stored in the memory and executable on the processor, where the processor executes the computer program to perform the beam failure processing method hereinabove.

In a seventh aspect, a computer-readable storage medium is provided in an embodiment of the present disclosure, where a computer program is stored in the computer-readable storage medium, a processor executes the computer program to perform the beam failure processing method hereinabove.

According to the embodiments of the present disclosure, a quantity of target downlink BWPs configured with the CORESET-BFR is smaller than a quantity of configured downlink BWPs of the terminal, so that when a beam failure event occurs on the active BWP of the terminal, the target downlink configured with the CORESET-BFR may be used BWP to receive the beam failure recovery response information, thereby not only guaranteeing the normal progress of the beam failure recovery process, but also increasing the quantity of CORESETs used for the normal communication process, guaranteeing sufficient transmission resources for the normal communication.

BRIEF DESCRIPTION OF THE DRAWINGS

In order to explain the technical solutions of the embodiments of the present disclosure more clearly, the following will briefly introduce the drawings that need to be used in the description of the embodiments of the present disclosure. Obviously, the drawings in the following description are only some embodiments of the present disclosure. For those of ordinary skill in the art, other drawings can be obtained based on these drawings without creative work.

DETAILED DESCRIPTION

The embodiments of the present disclosure will be described in more detail with reference to the drawings. Although the embodiments of the present disclosure are shown in the drawings, it should be understood that the present disclosure may be implemented in various forms and should not be limited by the embodiments herein. On the contrary, these embodiments are provided to enable a more thorough understanding of the present disclosure and to fully convey the scope of the present disclosure to those skilled in the art. The terms "first" and "second" in the description and claims of the present disclosure are used to distinguish similar objects, but not used to describe a specific order or sequence. It should be understood that the data used in this way may be interchanged under appropriate circumstances, so that the embodiments of the present disclosure described herein may be, for example, implemented in a sequence other than those illustrated or described herein.

In addition, the terms "including" and "include" and any variations of them are intended to cover non-exclusive inclusion. For example, a process, method, system, product or device that includes a series of steps or units is not necessarily limited to the those clearly listed steps or units, but may include other steps or units that are not clearly listed or are inherent to these processes, methods, products, or devices.

Figure 1:
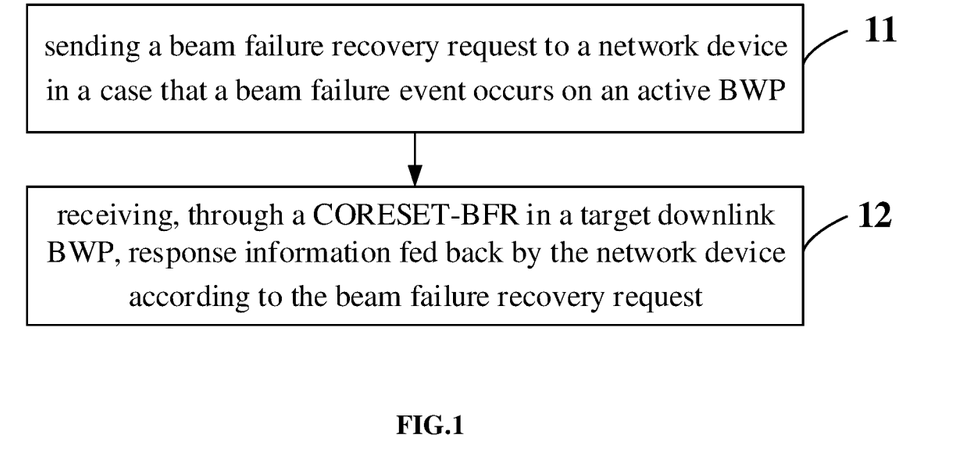
FIG. 1 is a schematic flowchart of a beam failure processing method of a terminal in an embodiment of the present disclosure.

A beam failure processing method applied to a terminal side is provided in an embodiment of the present disclosure. As shown in FIG. 1, the method includes the following steps:

Step 11: sending a beam failure recovery request to a network device in a case that a beam failure event occurs on an active Bandwidth Part (active BWP).

In a high-frequency communication system, because the wavelength of the wireless signal is short, the signal transmission is apt to be blocked, which causes the signal transmission to be interrupted. If the signal transmission is reestablished through the radio link in the related art, it will take a long time. Therefore, a beam failure recovery mechanism is introduced, including:

Beam failure detection: the terminal measures the beam failure detection reference signal (Beam Failure Detection Reference Signal, BFD RS) at the physical layer, and determines whether a beam failure event occurs according to the measurement result. The conditions for the terminal to determine the occurrence of a beam failure event include: if the metrics of all serving control beams are detected to meet preset conditions, e.g., a block error ratio (Block Error Ratio, BLER) of a physical downlink control channel (Physical Downlink Control Channel, PDCCH) exceeds a preset threshold, it is determined as a beam failure instance, and the physical layer of the terminal reports an indication to the higher layer, such as the Media Access Control (MAC) layer, and this reporting process is periodic. Correspondingly, if the physical layer of the terminal determines that no beam failure instance has occurred, it does not send an indication to the higher layer. The higher layer of the terminal uses a counter to count the indications reported by the physical layer. When a maximum number configured by the network is reached, the terminal determines that a beam failure event has occurred.

Optionally, before Step 11, the method further includes: detecting a BFD RS on the active BWP to determine whether the beam failure event occurs. The condition of the occurrence of a beam failure event is: a continuous number of beam failure instances on the downlink active BWP reaches a configuration value of the network device. The beam failure instance refers to that the BFD RS detection results of all serving control beams meet the preset conditions.

New candidate beam identification: the physical layer of the terminal measures candidate beam reference signals (candidate beam RS) to find new candidate beams. This step is not mandatory to be executed after the beam failure event occurs, but can also be executed before the beam failure event occurs. When the physical layer of the terminal receives a request, instruction or notification from the higher layer of the terminal, it will report the measurement result that meets the preset conditions to the higher layer of the terminal. For example, the measurement quality of the candidate beam RS exceeds a preset threshold of the level 1-reference signal received power (Level 1-Reference Signal Received Power (L1-RSRP), and the reporting content may be {beam reference signal index (beam RS index), L1-RSRP}, and the higher layer of the terminal selects the candidate beams based on the report of the physical layer.

Sending a beam failure recovery request: the higher layer of the terminal determines the PRACH resource or sequence according to the selected candidate beams. If the terminal determines that the trigger condition of the beam failure recovery request is met, the terminal sends the above beam failure recovery request to the network device on the non-contention-based PRACH. The terminal needs to send the beam failure recovery request according to the number of transmissions and/or timers configured by the network device. The non-competitive PRACH resources mentioned here and other PRACH resources (such as PRACH resources for initial access) may be resources for frequency division multiplexing FDM or code division multiplexing CDM, where the preambles of the PRACH of CDM should have the same sequence design.

Step 12: receiving, through a Control Resource Set for Beam Failure Recovery (CORESET-BFR) in a target downlink BWP, response information fed back by the network device according to the beam failure recovery request.

Specifically, another step of the beam failure recovery mechanism includes:

the terminal monitoring the response information of the network device for the beam failure recovery request (UE monitors gNB response for beam failure recovery request): after the network device receives the beam failure recovery request sent by the terminal, it will the response information on the dedicated PDCCH on the CORESET-BFR, where the response information may carry a cell-radio network temporary identity (Cell-Radio Network Temporary Identity, C-RNTI), switching to a new candidate beam, restarting the beam search, or other indication information. If the beam failure recovery is unsuccessful, the physical layer of the terminal sends an indication to the higher layer of the terminal for the higher layer to determine the subsequent radio link failure process. When the terminal receives response information on the dedicated PDCCH of CORESET-BFR, it is considered that the beam failure recovery is successful. When the terminal does not receive the response information on the dedicated PDCCH of CORESET-BFR, the terminal reselects the random access resource corresponding to the new candidate beam to send the beam failure recovery request. The new candidate beam determined by the terminal may be the same with as or different from the candidate beam selected last time. If the terminal receives the response message before the maximum number of transmissions configured by the network device is reached and/or the timer expires, it is considered that the beam failure recovery is successful; if the terminal does not receive the response after the maximum number of transmissions is reached and/or timer expires, it is considered that the beam failure recovery fails.

Since the network device may configure 4 downlink BWPs at most for the terminal, and each BWP may have 3 CORESETs at most. If the network device configures a CORESET-BFR for the beam failure recovery mechanism on each downlink BWP, then the quantity of CORESETs used for the normal communication process will be reduced, and more CORESET will be occupied, then the CORESETs used for the normal communication will be insufficient. In order to avoid the above issue, the target downlink BWP configured with CORESET-BFR corresponds to at least two BWPs, and the at least two BWPs include the active BWP. In other words, multiple downlink BWPs of the terminal may be configured with a CORESET-BFR to ensure the normal progress of the beam failure recovery process, and then the number of CORESET reserved for the normal communication process will be increased, to ensure sufficient transmission resources for the normal communication. It is noted that the above CORESET-BFR may be used in normal communication procedures in addition to the beam failure recovery mechanism. That is to say, the CORESET resource reserved for the beam failure recovery mechanism may be the same with or different from the CORESET resource for normal communication.

Since the target downlink BWP corresponds to at least two BWPs, and the active BWP is included in the at least two BWPs, the target downlink BWP may be the active BWP or other downlink BWPs of the terminal. The implementation of step 12 in these two scenarios may be referred to as follows:

Scenario 1: when the target downlink BWP is the active BWP where a beam failure event occurs, receiving, through the CORESET-BFR in the target downlink BWP, response information fed back by the network device according to the beam failure recovery request.

Assuming that only one downlink BWP (such as BWP1) of the terminal is configured with a CORESET-BFR, and the other downlink BWPs (such as BWP2, BWP3, and BWP4) are not configured with a CORESET-BFR. The current BWP1 is active BWP. When the terminal detects the BFD RS on BWP1, the terminal determines that a beam failure event has occurred, and finds a candidate beam, the terminal will send a beam failure recovery request to the network device. After that, the terminal monitors the CORESET-BFR in BWP1 to receive the response information which is fed back by the network device according to the beam failure recovery request. If the response information is received, it is considered that the beam failure recovery is successful; if the response information is not received, the terminal resends the beam failure recovery request, and then monitors the CORESET-BFR on BWP1 after resending the beam failure recovery request, until it is finally determined that the beam failure recovery is successful or unsuccessful.

Scenario 2: when the target downlink BWP is different from the active BWP where the beam failure event occurs, the terminal switches to the target downlink BWP, and receives, through the CORESET-BFR in the target downlink BWP, response information fed back by the network device according to the beam failure recovery request.

Assuming that only one downlink BWP (such as BWP1) of the terminal is configured with a CORESET-BFR, and the other downlink BWPs (such as BWP2, BWP3, and BWP4) are not configured with a CORESET-BFR. The current BWP2 is an active BWP. When the terminal detects the BFD RS on BWP2, determines that a beam failure event has occurred and finds a candidate beam, the terminal will send a beam failure recovery request to the network device. After that, the terminal switches from BWP2 to BWP1, and monitors CORESET-BFR on BWP1 to receive the response information which is fed back by the network device according to the beam failure recovery request. If the response information is received, it is considered that the beam failure recovery is successful; if the response information is not received, the terminal resends the beam failure recovery request, and then monitors the CORESET-BFR on BWP1 after resending the beam failure recovery request, until it is finally determined that the beam failure recovery is successful or unsuccessful.

When there is one target downlink BWP, the target downlink BWP may be regarded as the default downlink BWP. If the active BWP where the beam failure event occurs is not configured with the CORESET-BFR that needs to be monitored in the beam failure recovery mechanism, the terminal monitors the CORESET-BFR on the default downlink BWP. The default downlink BWP is configured by the network device or predefined by the protocol. The default downlink BWP is always configured with CORESET-BFR by the network device, or the CORESET with the smallest index on the default downlink BWP is used as the CORESET-BFR.

It is noted that the target downlink BWP configured with CORESET-BFR above may be predefined, or configured by the network device through the configuration information of beam failure recovery. When the target downlink BWP is predefined by the protocol, the target downlink BWP may also be referred to as the default BWP, which may be defined as the same default BWP for other purposes (such as initial access), or may be a downlink BWP configured independently. When the target downlink BWP is configured by a network device, it can be configured through a high-level signaling, such as radio resource control RRC signaling, and the quantity of target downlink BWPs configured by the network device may be one or more. The network device may further configure the mapping relationship between the target downlink BWP and the terminal BWP. Assuming that the network device configures 4 downlink BWPs for the terminal, namely: BWP1, BWP2, BWP3, and BWP4, and configures CORESET-BFRs on two of the downlink BWPs (e.g., BWP1 and BWP2), but does not configure CORESET-BFRs on the other downlink BWPs (e.g., BWP3, BWP4). The network device further configures the CORESET-BFR on BWP1 to correspond to BWP1 and BWP3, and the CORESET-BFR on BWP2 to correspond to BWP2 and BWP4. It is noted that the specific indication form may be an explicit indication (such as adding indication information to indicate the corresponding BWP, etc.) or an implicit indication (such as implicit indication through a resource association relationship, etc.). It is noted that when the network device configures a target downlink BWP for the terminal, the mapping relationship between the target downlink BWP and other BWPs may no longer be indicated.

In some embodiments of the present disclosure, the above configuration information includes at least one of the following:

1. first BWP information of the target downlink BWP where the CORESET-BFR is located, i.e., the relevant information of the CORESET-BFR. The first BWP information includes identification information of the target downlink BWP, that is, includes the information of the downlink BWP where the CORESET-BFR is located, e.g., a BWP index (BWP id). Optionally, the BWP id is added to the configuration parameters of CORESET-BFR to indicate the downlink BWP where CORESET-BFR is located. The BWP id in the newly added CORESET-BFR configuration parameter may be the same with or different from the active BWP where the BFD RS resource for detecting the beam failure event is located. For example, the terminal detects the BFD RS on the active BWP, but monitors the CORESET-BFR on another downlink BWP, thereby improving the flexibility of CORESET-BFR configuration. Optionally, the CORESET-BFR may be the same with or different from other CORESETs.

2. first resource information of beam failure detection reference signal. The first resource information includes at least one of the following: a quasi co-location relationship between a BFD RS resource and the CORESET-BFR, for example, the BFD RS configured by the network is not related to the CORESET-BFR spatial QCL, that is, the terminal does not detect the beam where the CORESET-BFR is located during the beam failure detection; a quasi co-location relationship between the BFD RS resource and a target CORESET, where an index of the target CORESET is a preset value, for example, id is 0. For example, the BFD RS configured by the network does not have a CORESET (CORESET 0) spatial QCL with an id of 0, that is, the terminal does not detect the beam where CORESET 0 is located during the beam failure detection. It is noted that the quasi co-location relationship between the resource of the BFD RS and the above CORESET may be determined by the terminal according to the respective configuration of the quasi co-location parameters, for example, in a case that the quasi co-location parameter of the BFD RS resource and the quasi co-location parameter of CORESET-BFR are different, it is determined that the resource where the BFD RS and the CORESET-BFR are not in a quasi co-location relationship. In addition, the first resource information may further include: BWP information of the downlink BWP where the BFD RS is located.

3. second resource information of a candidate beam reference signal, i.e., the related information of the candidate beam reference signal resource.

4. random access resource information for transmitting the beam failure recovery request, i.e., information related to the PRACH for sending the beam failure recovery request. The random access resource information includes: third BWP information of the uplink BWP where the random access resource is located. For example, it includes the information of the uplink BWP where the PRACH is located, such as the BWP index value (BWP id). Optionally, in the RRC signaling, the BWP id is added to the PRACH configuration parameter used to send the beam failure recovery request to indicate the uplink BWP used by the PRACH resource. The BWP id in the newly-added PRACH configuration parameter may be different from the first uplink BWP (the first uplink BWP is associated with the downlink active BWP where the beam failure event is currently detected), or may be different from the second uplink BWP (the second uplink BWP is associated with the downlink BWP where the candidate beam reference signal resource is located), or may be different from the third uplink BWP (the third uplink BWP is the uplink BWP where the PRACH resource is located, where the PRACH resource corresponds to the candidate beam reference signal resource), thereby improving the flexibility of PRACH configuration.

Second BWP information of a downlink BWP where other CORESET is located, where the other CORESET is a CORESET other than the CORESET-BFR. It is noted that, according to the second BWP information and the first BWP information, the terminal may determine that the CORESET-BFR is the same with or different from the other CORESETs.

In some embodiments of the present disclosure, when a beam failure event occurs and a candidate beam is found, the terminal determines the PRACH resource according to the selected candidate beam, and sends a beam failure recovery request to the network device on the determined PRACH resource. Optionally, when the above-mentioned configuration information includes the resource information of the candidate beam reference signal and the random access resource information, Step 11 includes: determining a target random access resource corresponding to a target beam according to a correspondence between the resource information of the candidate beam reference signal and the random access resource information; and sending the beam failure recovery request to the network device through the target random access resource, where the target beam is one candidate beam meeting a preset condition of at least one candidate beam. That is, the configuration information indicates the correspondence between the resource of the candidate beam reference signal and the random access resource. After determining the target beam, the terminal may determine the corresponding target random access resource according to the correspondence. Specifically, the terminal determines the target PRACH resource according to the selected candidate beams, which means that the network device may configure the correspondence between the candidate beam RS resource and the PRACH resource, and the terminal determines the target PRACH resources according to the correspondence and the RS resource used by the selected candidate beams.

Prior to the determining the target random access resource corresponding to the target beam according to the correspondence between the resource information of the candidate beam reference signal and the random access resource information, the method further includes: detecting at least one candidate beam reference signal, and determining candidate beams meeting the preset condition; and determining one of the candidate beams meeting the preset condition as the target beam. Specifically, when the physical layer of the terminal receives a request, instruction or notification from the higher layer of the terminal, it reports the measurement result that meets the preset conditions to the higher layer of the terminal. For example, the measurement quality of the candidate beam RS exceeds a preset threshold of the level 1-reference signal received power (Level 1-Reference Signal Received Power (L1-RSRP), and the reporting content may be {beam reference signal index (beam RS index), L1-RSRP}, and the higher layer of the terminal selects the candidate beams based on the report of the physical layer.

Optionally, the terminal monitors the CORESET-BFR according to the above-mentioned scenario 1 and scenario 2 after the protocol agreed time period after the terminal sends the beam failure recovery request, to receive the response information sent by the network device in the dedicated PDCCH on the CORESET-BFR. The duration of monitoring the CORESET-BFR is determined by the monitoring window configured by the network device. Optionally, the configuration information further includes: indication information configured to indicate a mapping relationship between an uplink BWP where a random access resource is located and the target downlink BWP. Subsequent to the sending the beam failure recovery request to the network device through the target random access resource, the method further includes: determining, according to the indication information, the target downlink BWP corresponding to the uplink BWP where the target random access resource is located. In other words, the network device configures the correspondence between the uplink BWP where the random access resource for sending the beam failure recovery request is located and the downlink BWP configured with CORESET-BFR, and the target downlink BWP corresponding to the target random access resource may be determined according to the correspondence. In this way, the terminal may monitor the CORESET-BFR on the downlink BWP corresponding to the uplink BWP where the PRACH for sending the beam failure recovery request is located.

In some embodiments of the present disclosure, after Step 12, the method further includes: determining the target downlink BWP as the new active BWP, and continuing to monitor other CORESETs and receive PDSCH on the target downlink BWP, or switching from the target downlink BWP to another downlink BWP to continue monitoring other CORESETs and receiving PDSCH, where the other downlink BWP switched to at this time serves as the new active BWP. The other downlink BWP is the BWP where the CORESET to be monitored and configured by the network device is located. In other words, after the terminal monitors the CORESET-BFR in the monitoring window configured by the network device, the terminal may continue to monitor other CORESETs and receive PDSCH on the target downlink BWP, or after monitoring the CORESET-BFR in the monitoring window configured by the network device, switch to another BWP where the CORESET to be monitored and configured by the network device is located. The other BWP may be the original active BWP where the beam failure event occurs, or another BWP.

According to the beam failure processing method in the embodiment of the present disclosure, when a beam failure event occurs in the active BWP, the terminal receives the beam failure recovery response information through the target downlink BWP configured with CORESET-BFR, thereby guaranteeing the normal progress of the beam failure recovery process. At the same time, the quantity of target downlink BWPs is smaller than the quantity of configured downlink BWPs of the terminal, so that the quantity of CORESETs used in the normal communication process may be increased, thereby guaranteeing sufficient transmission resources for the normal communication.

The above embodiments have described beam failure processing methods in different scenarios, and the corresponding terminal will be further described below in conjunction with the drawings.

Figure 2:
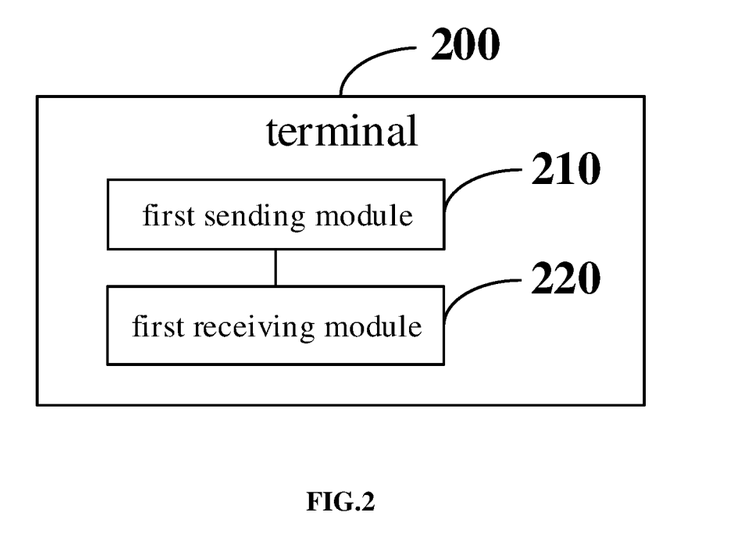
FIG. 2 is a schematic diagram of a module structure of a terminal in an embodiment of the present disclosure.

As shown in FIG. 2, the terminal 200 of the embodiment of the present disclosure may send a beam failure recovery request to the network device when a beam failure event occurs on the active BWP, and receive, through a CORESET-BFR in a target downlink BWP, response information fed back by the network device according to the beam failure recovery request, and the same effect may be achieved. The target downlink BWP corresponds to at least two BWPs, and at least two BWPs includes the active BWP. The terminal 200 specifically includes the following functional modules:

a first sending module 210, configured to send a beam failure recovery request to a network device in a case that a beam failure event occurs on an active Bandwidth Part (active BWP); and a first receiving module 220, configured to receive, through a Control Resource Set for Beam Failure Recovery (CORESET-BFR) in a target downlink BWP, response information fed back by the network device according to the beam failure recovery request, where the target downlink BWP corresponds to at least two BWPs, and the at least two BWPs includes the active BWP.

Optionally, the first receiving module 220 includes:

a first sending sub-module, configured to, in a case that the target downlink BWP is the active BWP where the beam failure event occurs, receive, through the CORESET-BFR in the target downlink BWP, the response information fed back by the network device according to the beam failure recovery request; or a second sending sub-module, configured to, in a case that the target downlink BWP is different from the active BWP where the beam failure event occurs, switch to the target downlink BWP, and receive, through the CORESET-BFR in the target downlink BWP, the response information fed back by the network device according to the beam failure recovery request.

Optionally, the target downlink BWP is predefined, or configured by the network device based on configuration information for beam failure recovery.

Optionally, the configuration information includes at least one of:

first BWP information of the target downlink BWP where the CORESET-BFR is located;

first resource information of beam failure detection reference signal (Beam Failure Detection Reference Signal, BFD RS);

second resource information of a candidate beam reference signal;

random access resource information for transmitting the beam failure recovery request; and second BWP information of a downlink BWP where other CORESET is located, where the other CORESET is a CORESET other than the CORESET-BFR.

Optionally, the first resource information includes at least one of:

a quasi Co-location relationship between a BFD RS resource and the CORESET-BFR; and a quasi Co-location relationship between the BFD RS resource and a target CORESET, where an index of the target CORESET is a preset value.

Optionally, in a case that the configuration information includes resource information of the candidate beam reference signal and the random access resource information, the first sending module 210 includes:

a first determining sub-module, configured to determine a target random access resource corresponding to a target beam according to a correspondence between the resource information of the candidate beam reference signal and the random access resource information, where the target beam is one candidate beam meeting a preset condition of at least one candidate beam; and a first sending sub-module, configured to send the beam failure recovery request to the network device through the target random access resource.

Optionally, the terminal 200 further includes:

a first determining module, configured to detect at least one candidate beam reference signal, and determining candidate beams meeting the preset condition; and a second determining module, configured to determine one of the candidate beams meeting the preset condition as the target beam.

Optionally, the random access resource information includes: third BWP information of an uplink BWP where a random access resource is located.

Optionally, the configuration information further includes:

indication information configured to indicate a mapping relationship between an uplink BWP where a random access resource is located and the target downlink BWP.

Optionally, the terminal 200 further includes:

a third determining module, configured to determine, according to the indication information, the target downlink BWP corresponding to the uplink BWP where the target random access resource is located.

Optionally, the terminal 200 further includes:

a fourth determining module, configured to detect a BFD RS on the active BWP to determine whether the beam failure event occurs.

It is noted that, according to the terminal in the embodiment of the present disclosure, when a beam failure event occurs in the active BWP, the terminal receives the beam failure recovery response information through the target downlink BWP configured with CORESET-BFR, thereby guaranteeing the normal progress of the beam failure recovery process. At the same time, the quantity of target downlink BWPs is smaller than the quantity of configured downlink BWPs of the terminal, so that the quantity of CORESETs used in the normal communication process may be increased, thereby guaranteeing sufficient transmission resources for the normal communication.

Figure 3:
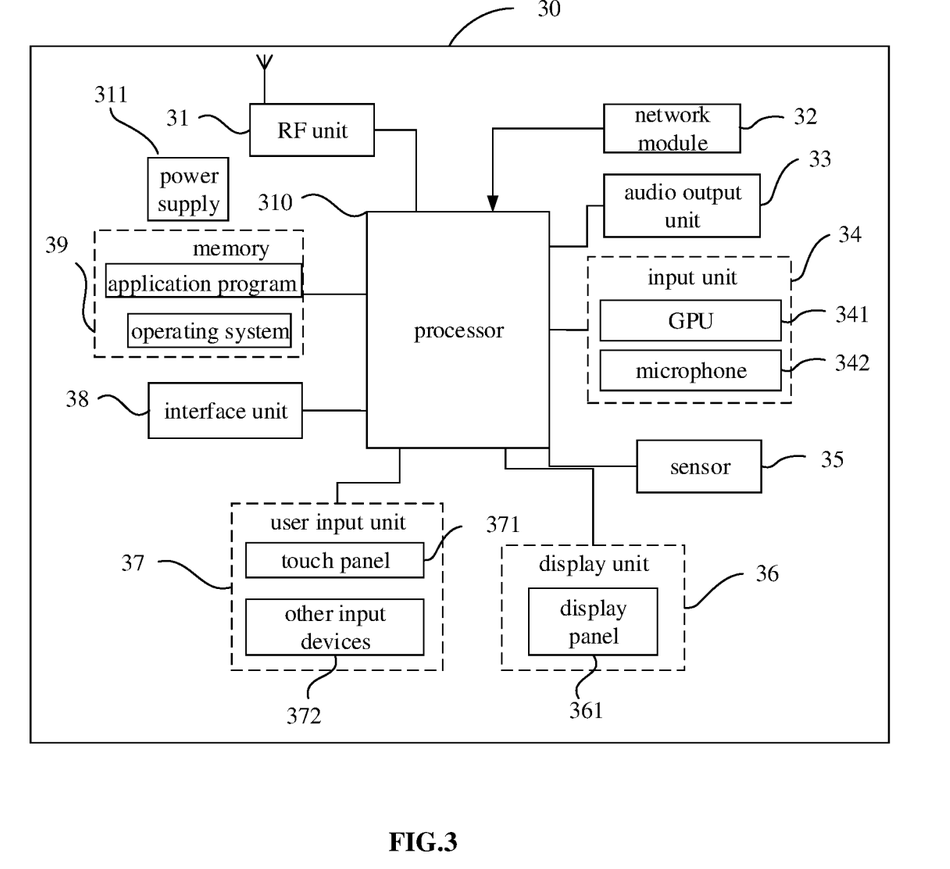
FIG. 3 is a block diagram of a terminal in an embodiment of the present disclosure.

In order to better achieve the foregoing objectives, further, FIG. 3 is a schematic diagram of a hardware structure of a terminal for implementing various embodiments of the present disclosure. The terminal 30 includes but is not limited to: a radio frequency unit 31, a network module 32, an audio output unit 33, Input unit 34, sensor 35, display unit 36, user input unit 37, interface unit 38, memory 39, processor 310, power supply 311 and other components. Those skilled in the art may understand that the terminal structure shown in FIG. 3 does not constitute a limitation on the terminal, and the terminal may include more or fewer components than shown in the figure, or combine some components, or arrange different components. In the embodiments of the present disclosure, terminals include, but are not limited to, mobile phones, tablet computers, notebook computers, palmtop computers, vehicle-mounted terminals, wearable devices, and pedometers.

The radio frequency unit 31 is configured to, under the control of the processor 310, send a beam failure recovery request to a network device in a case that a beam failure event occurs on an active BWP;

receive, through a CORESET-BFR in a target downlink BWP, response information fed back by the network device according to the beam failure recovery request, where the target downlink BWP corresponds to at least two BWPs, and the at least two BWPs includes the active BWP According to the terminal in the embodiment of the present disclosure, when a beam failure event occurs in the active BWP, the terminal receives the beam failure recovery response information through the target downlink BWP configured with CORESET-BFR, thereby guaranteeing the normal progress of the beam failure recovery process. At the same time, the quantity of target downlink BWPs is smaller than the quantity of configured downlink BWPs of the terminal, so that the quantity of CORESETs used in the normal communication process may be increased, thereby guaranteeing sufficient transmission resources for the normal communication.

It should be understood that, in the embodiment of the present disclosure, the radio frequency unit 31 can be used for receiving and sending signals in the process of sending and receiving information or talking. Specifically, the downlink data from the base station is received and processed by the processor 310; in addition, Uplink data is sent to the base station. Generally, the radio frequency unit 31 includes, but is not limited to, an antenna, at least one amplifier, a transceiver, a coupler, a low noise amplifier, a duplexer, and the like. In addition, the radio frequency unit 31 can also communicate with the network and other devices through a wireless communication system.

The terminal provides users with wireless broadband Internet access through the network module 32, such as helping users to send and receive emails, browse web pages, and access streaming media.

The audio output unit 33 may convert the audio data received by the radio frequency unit 31 or the network module 32 or stored in the memory 39 into an audio signal and output it as sound. Moreover, the audio output unit 33 may also provide audio output related to a specific function performed by the terminal 30 (for example, call signal reception sound, message reception sound, etc.). The audio output unit 33 includes a speaker, a buzzer, a receiver, and the like.

The input unit 34 is used to receive audio or video signals. The input unit 34 may include a graphics processing unit (GPU) 341 and a microphone 342, and the graphics processor 341 is configured to respond to still pictures or video images obtained by an image capture device (such as a camera) in a video capture mode or an image capture mode. The processed image frame can be displayed on the display unit 36. The image frame processed by the graphics processor 341 may be stored in the memory 39 (or other storage medium) or sent via the radio frequency unit 31 or the network module 32. The microphone 342 can receive sound, and can process such sound as audio data. The processed audio data can be converted into a format that can be sent to the mobile communication base station via the radio frequency unit 31 for output in the case of a telephone call mode.

The terminal 30 also includes at least one sensor 35, such as a light sensor, a motion sensor, and other sensors. Specifically, the light sensor includes an ambient light sensor and a proximity sensor. The ambient light sensor can adjust the brightness of the display panel 361 according to the brightness of the ambient light. The proximity sensor can close the display panel 361 and/or when the terminal 30 is moved to the ear. As a kind of motion sensor, the accelerometer sensor can detect the magnitude of acceleration in various directions (usually three-axis), and can detect the magnitude and direction of gravity when stationary, and can be used to identify terminal posture (such as horizontal and vertical screen switching, related games, magnetometer attitude calibration), vibration recognition related functions (such as pedometer, tap), etc.; sensor 35 can also include fingerprint sensor, pressure sensor, iris sensor, molecular sensor, gyroscope, barometer, hygrometer, thermometer, infrared sensors, etc., which will not be repeated here.

The display unit 36 is used to display information input by the user or information provided to the user. The display unit 36 may include a display panel 361, and the display panel 361 may be configured in the form of a liquid crystal display (LCD), an organic light-emitting diode (OLED), etc.

The user input unit 37 can be used to receive inputted numeric or character information, and generate key signal inputs related to user settings and function control of the terminal. Specifically, the user input unit 37 includes a touch panel 371 and other input devices 372. The touch panel 371, also known as a touch screen, can collect user touch operations on or near it (for example, the user uses any suitable objects or accessories such as fingers, stylus, etc.) on the touch panel 371 or near the touch panel 371). The touch panel 371 may include two parts, a touch detection device and a touch controller. The touch detection device detects the user's touch position, and detects the signal brought by the touch operation, and transmits the signal to the touch controller; the touch controller receives the touch information from the touch detection device, converts it into contact coordinates, and then sends it to the processor 310, the command sent by the processor 310 is received and executed. In addition, the touch panel 371 can be implemented in multiple types such as resistive, capacitive, infrared, and surface acoustic wave. In addition to the touch panel 371, the user input unit 37 may also include other input devices 372. Specifically, other input devices 372 may include, but are not limited to, a physical keyboard, function keys (such as volume control buttons, switch buttons, etc.), trackball, mouse, and joystick, which will not be repeated here.

Further, the touch panel 371 may cover the display panel 361. When the touch panel 371 detects a touch operation on or near it, it transmits it to the processor 310 to determine the type of the touch event, and then the processor 310 responds to the touch type of event and provides corresponding visual output on the display panel 361. Although in FIG. 3, the touch panel 371 and the display panel 361 are used as two independent components to realize the input and output functions of the terminal, but in some embodiments, the touch panel 371 and the display panel 361 can be integrated, to realize the input and output functions of the terminal, which are not limited here.

The interface unit 38 is an interface for connecting an external device and the terminal 30. For example, the external device may include a wired or wireless headset port, an external power source (or battery charger) port, a wired or wireless data port, a memory card port, a port for connecting a device with an identification module, audio input/output (I/O) port, video I/O port, headphone port, etc. The interface unit 38 may be used to receive input (for example, data information, power, etc.) from an external device and transmit the received input to one or more elements in the terminal 30 or may be used to transfer data between the terminal 30 and the external device.

The memory 39 can be used to store software programs and various data. The memory 39 may mainly include a storage program area and a storage data area. The storage program area may store an operating system, an application program required by at least one function (such as a sound playback function, an image playback function, etc.), etc.; storage data area may store data (such as audio data, phone book, etc.) created by the use of mobile phones. In addition, the memory 39 may include a high-speed random access memory, and may also include a non-volatile memory, such as at least one magnetic disk storage device, a flash memory device, or other volatile solid-state storage devices.

The processor 310 is the control center of the terminal. It uses various interfaces and lines to connect various parts of the entire terminal. It executes by running or executing software programs and/or modules stored in the memory 39, and calling data stored in the memory 39. Various functions of the terminal and processing data, so as to monitor the terminal as a whole. The processor 310 may include one or more processing units; the processor 310 may integrate an application processor and a modem processor, where the application processor mainly processes the operating system, user interface, application programs, etc., and the modem processor mainly processes wireless communication. It can be understood that the foregoing modem processor may not be integrated into the processor 310.

The terminal 30 may also include a power source 311 (such as a battery) for supplying power to various components. Optionally, the power source 311 may be logically connected to the processor 310 through a power management system, so as to manage charging, discharging, and power consumption management through the power management system. Features.

In addition, the terminal 30 includes some functional modules not shown, which will not be repeated here.

Optionally, a terminal is further provided in the embodiment of the present disclosure, including a processor 310, a memory 39, a computer program stored in the memory 39 and running on the processor 310, and the computer program is implemented when the processor 310 is executed. Each process of the above beam failure processing method embodiment may achieve the same technical effect, and in order to avoid repetition, it will not be repeated here.

The terminal can be a wireless terminal or a wired terminal. The wireless terminal can be a device that provides voice and/or other service data connectivity to the user, a handheld device with wireless connection function, or other processing equipment connected to a wireless modem. A wireless terminal can communicate with one or more core networks via a radio access network (Radio Access Network, referred to as RAN). The wireless terminal can be a mobile terminal, such as a mobile phone (or "cellular" phone) and a mobile phone with a mobile terminal. Computers, for example, may be portable, pocket-sized, handheld, computer-built or vehicle-mounted mobile devices, which exchange language and/or data with the wireless access network. For example, Personal Communication Service (PCS) phones, cordless phones, Session Initiation Protocol (SIP) phones, Wireless Local Loop (WLL) stations, and Personal Digital Assistants (Personal Digital Assistants). Digital Assistant, PDA) and other equipment. Wireless terminal can also be called system, subscriber unit (Subscriber Unit), subscriber station (Subscriber Station), mobile station (Mobile Station), mobile station (Mobile), remote station (Remote Station), remote terminal (Remote Terminal), access terminal (Access Terminal), user terminal (User Terminal), user agent (User Agent), and user equipment (User Device or User Equipment) are not limited here.

A computer-readable storage medium is further provided in an embodiment of the present disclosure, and a computer program is stored in the computer-readable storage medium. A processor executes the computer program to perform the steps of the above beam failure processing method embodiment, and the same technical effects, in order to avoid repetition, it will not repeat them here. The computer-readable storage medium, such as read-only memory (Read-Only Memory, ROM), random access memory (Random Access Memory, RAM), magnetic disk, or optical disk, etc.

The above embodiment describes the beam failure processing method of the present disclosure at the terminal side. The following embodiment will further describe the beam failure processing method at the network device side in conjunction with the drawings.

Figure 4:
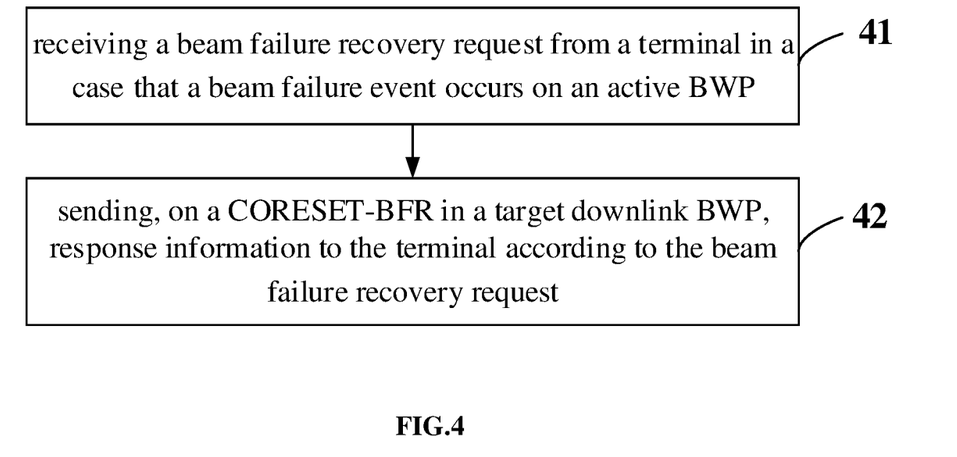
FIG. 4 is a schematic flowchart of a beam failure processing method of a network device in an embodiment of the present disclosure.

As shown in FIG. 4, the beam failure processing method of the embodiment of the present disclosure, applied to a network device, includes the following steps:

Step 41: receiving a beam failure recovery request from a terminal in a case that a beam failure event occurs on an active BWP.

When a beam failure event occurs in the active BWP of the terminal, the network device receives the beam failure recovery request sent by the terminal through the random access resource. The method for the terminal to send the beam failure recovery request may refer to the terminal-side implementation mode, and the corresponding network device perform the reception on the corresponding resource, which will not be repeated here.

Step 42: sending, on a CORESET-BFR in a target downlink BWP, response information to the terminal according to the beam failure recovery request.

The target downlink BWP corresponds to at least two BWPs, and the at least two BWPs include the active BWP. In other words, multiple downlink BWPs of the terminal may be configured with a CORESET-BFR to ensure the normal progress of the beam failure recovery process, and then the number of CORESET reserved for the normal communication process will be increased, to ensure sufficient transmission resources for the normal communication. It is noted that the above CORESET-BFR may be used in normal communication procedures in addition to the beam failure recovery mechanism. That is to say, the CORESET resource reserved for the beam failure recovery mechanism may be the same with or different from the CORESET resource for normal communication.

The target downlink BWP may be predefined, or configured by the network device through the configuration information of beam failure recovery. When the target downlink BWP is predefined by the protocol, the target downlink BWP may also be referred to as the default BWP, which may be defined as the same default BWP for other purposes (such as initial access), or may be a downlink BWP configured independently. When the target downlink BWP is configured by a network device, it can be configured through a high-level signaling, such as radio resource control RRC signaling, and the quantity of target downlink BWPs configured by the network device may be one or more. The network device may further configure the mapping relationship between the target downlink BWP and the terminal BWP.

Optionally, the configuration information includes at least one of:

first BWP information of the target downlink BWP where the CORESET-BFR is located;

first resource information of beam failure detection reference signal (Beam Failure Detection Reference Signal, BFD RS);

second resource information of a candidate beam reference signal;

random access resource information for transmitting the beam failure recovery request; and second BWP information of a downlink BWP where other CORESET is located, where the other CORESET is a CORESET other than the CORESET-BFR.

Optionally, the first resource information includes at least one of:

a quasi Co-location relationship between a BFD RS resource and the CORESET-BFR; and a quasi Co-location relationship between the BFD RS resource and a target CORESET, where an index of the target CORESET is a preset value.

Optionally, the random access resource information includes: third BWP information of an uplink BWP where a random access resource is located.

Optionally, the configuration information further includes:

indication information configured to indicate a mapping relationship between an uplink BWP where a random access resource is located and the target downlink BWP.

It is noted that the configuration information mentioned above and the information contained in the configuration information have the same functions as the related information in the terminal-side embodiment, and the information transmission mode thereof corresponds to terminal-side embodiment, and the terminal-side embodiment are all applicable to the embodiment at the network device side, so details thereof will not be repeated here.

According to the beam failure processing method in the embodiment of the present disclosure, when a beam failure event occurs in the active BWP, the terminal receives the beam failure recovery response information through the target downlink BWP configured with CORESET-BFR, thereby guaranteeing the normal progress of the beam failure recovery process. At the same time, the quantity of target downlink BWPs is smaller than the quantity of configured downlink BWPs of the terminal, so that the quantity of CORESETs used in the normal communication process may be increased, thereby guaranteeing sufficient transmission resources for the normal communication.

The above embodiments respectively describe in detail the beam failure processing methods in different scenarios. The following embodiment will further describe the corresponding network device in conjunction with the drawings.

Figure 5:
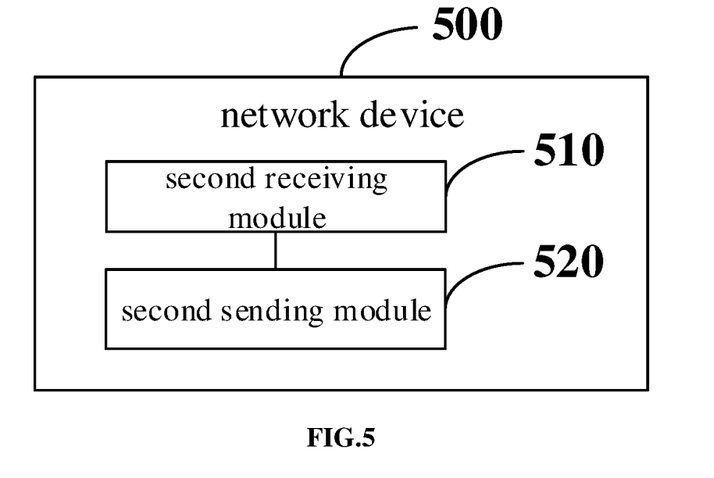
FIG. 5 is a schematic diagram of a module structure of a network device in an embodiment of the present disclosure.

As shown in FIG. 5, the network device 500 in the embodiment of the present disclosure may receive a beam failure recovery request from a terminal in a case that a beam failure event occurs on an active BWP; send, on a CORESET-BFR in a target downlink BWP, response information to the terminal according to the beam failure recovery request, and achieves the same effect, where the target downlink BWP corresponds to at least two BWPs, and the at least two BWPs includes the active BWP, the network device 500 specifically includes the following functional modules:

a second receiving module, configured to receive a beam failure recovery request from a terminal in a case that a beam failure event occurs on an active BWP; and a second sending module, configured to send, on a CORESET-BFR in a target downlink BWP, response information to the terminal according to the beam failure recovery request, where the target downlink BWP corresponds to at least two BWPs, and the at least two BWPs includes the active BWP.

Optionally, the target downlink BWP is predefined, or configured by the network device based on configuration information for beam failure recovery.

Optionally, the configuration information includes at least one of:

first BWP information of the target downlink BWP where the CORESET-BFR is located;

first resource information of beam failure detection reference signal (Beam Failure Detection Reference Signal, BFD RS);

second resource information of a candidate beam reference signal;

random access resource information for transmitting the beam failure recovery request; and second BWP information of a downlink BWP where other CORESET is located, where the other CORESET is a CORESET other than the CORESET-BFR.

Optionally, the first resource information includes at least one of:

a quasi Co-location relationship between a BFD RS resource and the CORESET-BFR; and a quasi Co-location relationship between the BFD RS resource and a target CORESET, where an index of the target CORESET is a preset value.

Optionally, the random access resource information includes: third BWP information of an uplink BWP where a random access resource is located.

Optionally, the configuration information further includes:

indication information configured to indicate a mapping relationship between an uplink BWP where a random access resource is located and the target downlink BWP.

It should be noted that it should be understood that the division of the above network device and the various modules of the terminal is only a division of logical functions, and may be fully or partially integrated into a physical entity in actual implementation, or may be physically separated. And these modules can all be implemented in the form of software called by processing elements; they can also be all implemented in the form of hardware; some modules can be implemented in the form of calling software by processing elements, and some modules can be implemented in the form of hardware. For example, the determination module may be a separately established processing element, or it may be integrated in a chip of the above-mentioned device for implementation. In addition, it may also be stored in the memory of the above-mentioned device in the form of program code, which is determined by a certain processing element of the above-mentioned device. Call and execute the functions of the above-identified module. The implementation of other modules is similar. In addition, all or part of these modules can be integrated together or implemented independently. The processing element described here may be an integrated circuit with signal processing capability. In the implementation process, each step of the above method or each of the above modules can be completed by an integrated logic circuit of hardware in the processor element or instructions in the form of software.

For example, the above modules may be one or more integrated circuits configured to implement the above methods, such as: one or more specific integrated circuits (ASIC), or one or more microprocessors (Digital signal processor, DSP), or, one or more Field Programmable Gate Array (FPGA), etc. For another example, when one of the above modules is implemented in the form of processing element scheduling program code, the processing element may be a general-purpose processor, such as a central processing unit (CPU) or other processors that can call program codes. For another example, these modules can be integrated together and implemented in the form of a system-on-a-chip (SOC).

It is noted that, according to the network device in the embodiment of the present disclosure, when a beam failure event occurs in the active BWP of the terminal, the network device sends the beam failure recovery response information through the target downlink BWP configured with CORESET-BFR, thereby guaranteeing the normal progress of the beam failure recovery process. At the same time, the quantity of target downlink BWPs is smaller than the quantity of configured downlink BWPs of the terminal, so that the quantity of CORESETs used in the normal communication process may be increased, thereby guaranteeing sufficient transmission resources for the normal communication.

In order to better achieve the above objective, a network device is further provided in the embodiment of the present disclosure. The network device includes a processor, a memory, and a computer program stored in the memory and running on the processor. The processor executes the computer program to perform the steps in the beam failure processing method as described above. A computer-readable storage medium having a computer program stored therein is further provided in the embodiment of the present disclosure. A processor executes the computer program to perform the steps in the beam failure processing method as described above.

Figure 6:
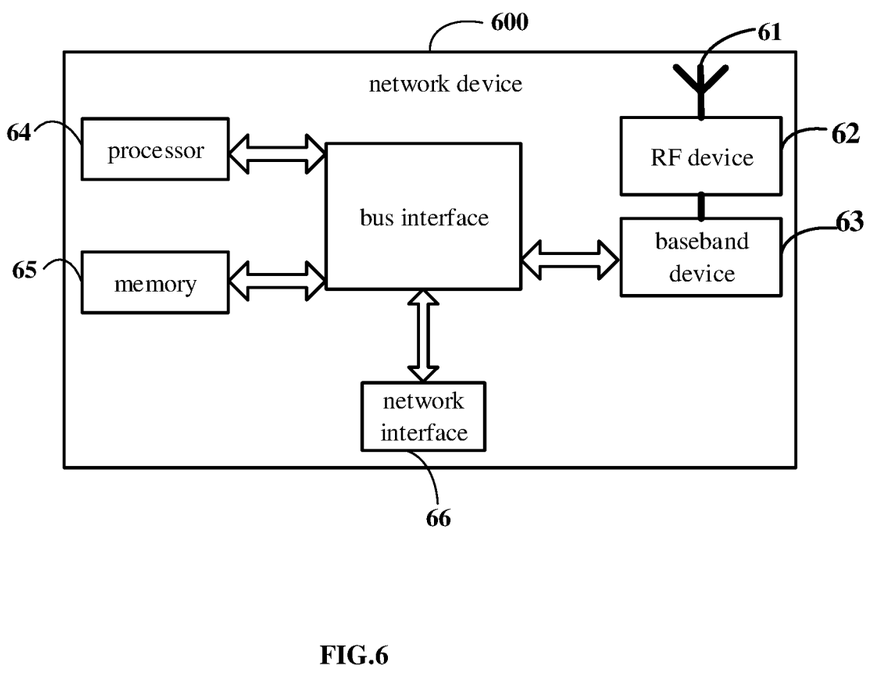
FIG. 6 is a block diagram of a network device in an embodiment of the present disclosure.

Specifically, a network device is further provided in the embodiment of the present disclosure. As shown in FIG. 6, the network device 600 includes an antenna 61, a radio frequency device 62, and a baseband device 63. The antenna 61 is connected to the radio frequency device 62. In the uplink direction, the radio frequency device 62 receives information through the antenna 61 and sends the received information to the baseband device 63 for processing. In the downlink direction, the baseband device 63 processes the information to be sent and sends it to the radio frequency device 62, and the radio frequency device 62 processes the received information and sends it out via the antenna 61.

The foregoing frequency band processing devices may be located in the baseband apparatus 63, and the method executed by the network device in the above embodiment may be implemented in the baseband apparatus 63, and the baseband apparatus 63 includes a processor 64 and a memory 65.

The baseband device 63 may include, for example, at least one baseband board, and multiple chips are arranged on the baseband board, as shown in FIG. 6, one of the chips is, for example, a processor 64, which is connected to a memory 65 to call programs in the memory 65 to perform the network device operation shown in the above method embodiment. The baseband device 63 may also include a network interface 66 for exchanging information with the radio frequency device 62. The interface is, for example, a common public radio interface (CPRI).

The processor here may be a processor, or a collective term for multiple processing elements. For example, the processor can be a CPU or an ASIC, or it can be configured to implement one or more of the methods executed by the above network devices. An integrated circuit, for example: one or more microprocessor DSP, or, one or more field programmable gate array FPGA, etc. The storage element may be a memory or a collective term for multiple storage elements.

The memory 65 may be a volatile memory or a non-volatile memory, or may include both volatile and non-volatile memory. The non-volatile memory can be a read-only memory (Read-Only Memory, ROM), a programmable read-only memory (Programmable ROM, PROM), and an erasable programmable read-only memory (Erasable PROM, EPROM), Electrically Erasable Programmable Read Only Memory (Electrically EPROM, EEPROM) or flash memory. The volatile memory may be a random access memory (Random Access Memory, RAM), which is used as an external cache. By way of exemplary but not restrictive description, many forms of RAM are available, such as static random access memory (Static RAM, SRAM), dynamic random access memory (Dynamic RAM, DRAM), and synchronous dynamic random access memory (Synchronous RAM). DRAM, referred to as SDRAM), double data rate synchronous dynamic random access memory (Double Data Rate SDRAM, referred to as DDRSDRAM), enhanced synchronous dynamic random access memory (Enhanced SDRAM, referred to as ESDRAM), and synchronously connected dynamic random access memory (Synch link DRAM, SLDRAM) and Direct Rambus RAM (DR-RAM). The memory 65 described in the present disclosure is intended to include, but is not limited to, these and any other suitable types of memory.

Specifically, the network device of the embodiment of the present disclosure further includes: a computer program stored in the memory 65 and executable on the processor 64, the processor 64 calls the computer program in the memory 65 to execute the method executed by each module shown in FIG. 5.

Specifically, the computer program is called by the processor 64 to execute: receive a beam failure recovery request from a terminal in a case that a beam failure event occurs on an active BWP; and send, on a CORESET-BFR in a target downlink BWP, response information to the terminal according to the beam failure recovery request, where the target downlink BWP corresponds to at least two BWPs, and the at least two BWPs includes the active BWP.

Optionally, the target downlink BWP is predefined, or configured by the network device based on configuration information for beam failure recovery.

Optionally, the configuration information includes at least one of:

first BWP information of the target downlink BWP where the CORESET-BFR is located;

first resource information of beam failure detection reference signal (Beam Failure Detection Reference Signal, BFD RS);

second resource information of a candidate beam reference signal;

random access resource information for transmitting the beam failure recovery request; and second BWP information of a downlink BWP where other CORESET is located, where the other CORESET is a CORESET other than the CORESET-BFR.

Optionally, the first resource information includes:

a quasi Co-location relationship between a BFD RS resource and the CORESET-BFR; and a quasi Co-location relationship between the BFD RS resource and a target CORESET, where an index of the target CORESET is a preset value.

Optionally, the random access resource information includes: third BWP information of an uplink BWP where a random access resource is located.

Optionally, the configuration information further includes:

indication information configured to indicate a mapping relationship between an uplink BWP where a random access resource is located and the target downlink BWP.

The network device can be a base station (BTS) in Global System of Mobile Communications (GSM) or Code Division Multiple Access (CDMA), or it can be a broadband code. The base station (NodeB, NB) in Wideband Code Division Multiple Access (WCDMA) may also be an evolved base station (Evolutional NodeB, eNB or eNodeB) in LTE, or a relay station or an access point. Or base stations in the future 5G network, etc., which are not limited here.

It is noted that, according to the network device in the embodiment of the present disclosure, when a beam failure event occurs in the active BWP of the terminal, the network device sends the beam failure recovery response information through the target downlink BWP configured with CORESET-BFR, thereby guaranteeing the normal progress of the beam failure recovery process. At the same time, the quantity of target downlink BWPs is smaller than the quantity of configured downlink BWPs of the terminal, so that the quantity of CORESETs used in the normal communication process may be increased, thereby guaranteeing sufficient transmission resources for the normal communication.

A person of ordinary skill in the art may realize that the units and algorithm steps of the examples described in combination with the embodiments disclosed herein can be implemented by electronic hardware or a combination of computer software and electronic hardware. Whether these functions are executed by hardware or software depends on the specific application and design constraints of the technical solution. Professionals and technicians can use different methods for each specific application to implement the described functions, but such implementation should not be considered beyond the scope of the present disclosure.

Those skilled in the art can clearly understand that, for convenience and concise description, the specific working process of the above-described system, device, and unit can refer to the corresponding process in the foregoing method embodiment, and details are not described herein again.

In the embodiments provided in the present disclosure, it should be understood that the disclosed device and method may be implemented in other ways. For example, the device embodiments described above are merely illustrative. For example, the division of the units is only a logical function division, and there may be other divisions in actual implementation, for example, multiple units or components may be combined or can be integrated into another system, or some features can be ignored or not implemented. In addition, the displayed or discussed mutual coupling or direct coupling or communication connection may be indirect coupling or communication connection through some interfaces, devices or units, and may be in electrical, mechanical or other forms.

The units described as separate components may or may not be physically separated, and the components displayed as units may or may not be physical units, that is, they may be located in one place, or they may be distributed on multiple network units. Some or all of the units may be selected according to actual needs to achieve the objectives of the solutions of the embodiments.

In addition, the functional units in the various embodiments of the present disclosure may be integrated into one processing unit, or each unit may exist alone physically, or two or more units may be integrated into one unit.

If the function is implemented in the form of a software functional unit and sold or used as an independent product, it can be stored in a computer readable storage medium. Based on this understanding, the technical solution of the present disclosure essentially or the part that contributes to the related technology or the part of the technical solution can be embodied in the form of a software product. The computer software product is stored in a storage medium, including several The instructions are used to make a computer device (which may be a personal computer, a server, or a network device, etc.) execute all or part of the steps of the methods described in the various embodiments of the present disclosure. The aforementioned storage media include: U disk, mobile hard disk, ROM, RAM, magnetic disk or optical disk and other media that can store program codes.

In addition, it should be pointed out that in the device and method of the present disclosure, obviously, each component or each step can be decomposed and/or recombined. These decomposition and/or recombination should be regarded as equivalent solutions of the present disclosure. Moreover, the steps of performing the above series of processing can naturally be performed in a time sequence according to the order of description, but do not necessarily need to be performed in a time sequence, and some steps can be performed in parallel or independently of each other. A person of ordinary skill in the art can understand that all or any of the steps or components of the method and device of the present disclosure can be used in any computing device (including a processor, storage medium, etc.) or a network of computing devices with hardware and firmware. Software, or a combination of them. This can be achieved by those of ordinary skill in the art using their basic programming skills after reading the description of the present disclosure.

Therefore, the purpose of the present disclosure can also be realized by executing a program or a group of programs on any computing device. The computing device may be a well-known general-purpose device. Therefore, the purpose of the present disclosure can also be achieved only by providing a program product containing program code for implementing the method or device. That is, such a program product also constitutes the present disclosure, and a storage medium storing such a program product also constitutes the present disclosure. Obviously, the storage medium may be any well-known storage medium or any storage medium developed in the future. It should also be pointed out that in the device and method of the present disclosure, obviously, each component or each step can be decomposed and/or recombined. These decomposition and/or recombination should be regarded as equivalent solutions of the present disclosure. In addition, the steps of performing the abovementioned series of processing can naturally be performed in chronological order in the order of description, but do not necessarily need to be performed in chronological order. Some steps can be performed in parallel or independently of each other.

The above are the some embodiments of the present disclosure. It should be noted that for those of ordinary skill in the art, several improvements and modifications may be made without departing from the principles described in the present disclosure, and these improvements and modifications are also within the scope of the present disclosure.

What is claimed is:

1. A beam failure processing method, applied to a terminal side, comprising:
   sending a beam failure recovery request to a network device in a case that a beam failure event occurs on an active Bandwidth Part (active BWP); and
   receiving, through a Control Resource Set for Beam Failure Recovery (CORESET-BFR) in at least one target downlink BWP, response information fed back by the network device according to the beam failure recovery request, wherein the target downlink BWP corresponds to at least two BWPs, and the at least two BWPs comprises the active BWP;
   wherein a quantity of the at least one target downlink BWP configured with the CORESET-BFR is smaller than a quantity of configured downlink BWPs of the terminal side.

2. The beam failure processing method according to claim 1, wherein the receiving through the CORESET-BFR in the target downlink BWP the response information fed back by the network device according to the beam failure recovery request comprises:

in a case that the target downlink BWP is the active BWP where the beam failure event occurs, receiving, through the CORESET-BFR in the target downlink BWP, the response information fed back by the network device according to the beam failure recovery request; or in a case that the target downlink BWP is different from the active BWP where the beam failure event occurs, switching to the target downlink BWP, and receiving, through the CORESET-BFR in the target downlink BWP, the response information fed hack by the network device according to the beam failure recovery request.

3. The beam failure processing method according to claim 1, wherein the target downlink BWP is predefined, or configured by the network device based on configuration information for beam failure recovery.

4. The beam failure processing method according to claim 3, wherein the configuration information comprises at least one of:

first BWP information of the target downlink BWP where the CORESET-BFR is located;

first resource information of beam failure detection reference signal (Beam Failure Detection Reference Signal, BFD RS);

second resource information of a candidate beam reference signal;

random access resource information for transmitting the beam failure recovery request; and second BWP information of a downlink BWP where other CORESET is located, wherein the other CORESET is a CORESET other than the CORESET-BFR.

5. The beam failure processing method according to claim 4, wherein the first resource information comprises at least one of:

a quasi co-location relationship between a BFD RS resource and the CORESET-BFR; and a quasi co-location relationship between the BFD RS resource and a target CORESET, wherein an index of the target CORESET is a preset value.

6. The beam failure processing method according to claim 4, wherein in a case that the configuration information comprises resource information of the candidate beam reference signal and the random access resource information, the sending the beam failure recovery request to the network device comprises;

determining a target random access resource corresponding to a target beam according to a correspondence between the resource information of the candidate beam reference signal and the random access resource information, wherein the target beam is one candidate beam meeting a preset condition of at least one candidate beam; and sending the beam failure recovery request to the network device through the target random access resource.

7. The beam failure processing method according to claim 6, wherein prior to the determining the target random access resource corresponding to the target beam according to the correspondence between the resource information of the candidate beam reference signal and the random access resource information, the method further comprises:

detecting at least one candidate beam reference signal, and determining candidate beams meeting the preset condition; and determining one of the candidate beams meeting the preset condition as the target beam.

8. The beam failure processing method according to claim 6, wherein the random access resource information comprises: third BWP information of an uplink BWP where a random access resource is located.

9. The beam failure processing method according to claim 6, wherein the configuration information further comprises:

indication information configured to indicate a mapping relationship between an uplink BWP where a random access resource is located and the target downlink BWP.

10. The beam failure processing method according to claim 9, wherein subsequent to the sending the beam failure recovery request to the network device through the target random access resource, the method further comprises:

determining, according to the indication information, the target downlink BWP corresponding to the uplink BWP Where the target random access resource is located.

11. The beam failure processing method according to claim 1, wherein prior to the sending the beam failure recovery request to the network device, the method further comprises:

detecting a BFD RS on the active BWP to determine whether the beam failure event occurs.

12. A terminal, comprising: a processor, a memory and a computer program stored in the memory and executable on the processor, wherein the processor executes the computer program to:

send a beam failure recovery request to a network device in a case that a beam failure event occurs on an active Bandwidth Part (active BWP); and receive, through a Control Resource Set for Beam Failure Recovery (CORESET-BFR) in at least one target downlink BWP, response information fed back by the network device according to the beam failure recovery request, wherein the target downlink BWP corresponds to at least two BWPs, and the at least two BWPs comprises the active BWP;

wherein a quantity of the at least on target downlink BWP configured with the CORESET-BFR is smaller than a quantity of configured downlink BWPs of the terminal side.

13. The terminal according to claim 12, wherein the processor executes the computer program to:

in a case that the target downlink BWP is the active BWP where the beam failure event occurs, receive, through the CORESET-BFR in the target downlink BWP, the response information fed back by the network device according to the beam failure recovery request; or in a case that the target downlink BWP is different from the active BWP where the beam failure event occurs, switch to the target downlink BWP, and receive, through the CORESET-BFR in the target downlink BWP, the response information fed back by the network device according to the beam failure recovery request.

14. The terminal according to claim 12, wherein the target downlink BWP is predefined, or configured by the network device based on configuration information for beam failure recovery.

15. A beam failure processing method, applied to a network device side, comprising:

receiving a beam failure recovery request from a terminal in a case that a beam failure event occurs on an active Bandwidth Part (active BWP); and sending, on a Control Resource Set for Beam Failure Recovery (CORESET-BFR) in at least one target downlink BWP, response information to the terminal according to the beam failure recovery request, wherein the target downlink BWP corresponds to at least two BWPs, and the at least two BWPs comprises the active BWP;

wherein a quantity of the at least One target downlink BWP configured with the CORESET-BFR is smaller than a quantity of the at least one target downlink BWP configured with the terminal side.

16. The beam failure processing method according to claim 15, wherein the target downlink BWP is predefined, or configured by the network device based on configuration information for beam failure recovery.

17. The beam failure processing method according to claim 16, wherein the configuration information comprises at least one of:

first BWP information of the target downlink BWP where the CORESET-BFR is located;

first resource information of beam failure detection reference signal (Beam Failure Detection Reference Signal, BFD RS);

second resource information of a candidate beam reference signal;

random access resource information for transmitting the beam failure recovery request; and second BWP information of a downlink BWP where other CORESET is located, wherein the other CORESET is a CORESET other than the CORESET-BFR.

18. The beam failure processing method according to claim 17, wherein the first resource information comprises at least one of:

a quasi co-location relationship between a BFD RS resource and the CORESET-BFR; and a quasi co-location relationship between the BFD RS resource and a target CORESET, wherein an index of the target CORESET is a preset value.

19. The beam failure processing method according to claim 17, wherein the random access resource information comprises: third BWP information of an uplink BWP where a random access resource is located.

20. A network device, comprising a processor, a memory and a computer program stored in the memory and executable on the processor, wherein the processor executes the computer program to perform the beam failure processing method according to claim 15.

* * * * *